US008358488B2

(12) United States Patent
Premerlani et al.

(10) Patent No.: US 8,358,488 B2
(45) Date of Patent: Jan. 22, 2013

(54) MICRO-ELECTROMECHANICAL SYSTEM BASED SWITCHING

(75) Inventors: William James Premerlani, Scotia, NY (US); Kanakasabapathi Subramanian, Clifton Park, NY (US); Christopher Fred Keimel, Schenectady, NY (US); Kathleen Ann O'Brien, Albany, NY (US); John Norton Park, Rexford, NY (US)

(73) Assignee: General Electric Company, Schenectady, NY (US)

( * ) Notice: Subject to any disclaimer, the term of this patent is extended or adjusted under 35 U.S.C. 154(b) by 1017 days.

(21) Appl. No.: 11/763,739

(22) Filed: Jun. 15, 2007

(65) Prior Publication Data

US 2008/0308394 A1 Dec. 18, 2008

(51) Int. Cl.
*H02H 3/02* (2006.01)

(52) U.S. Cl. .......... 361/2

(58) Field of Classification Search .......... 361/2
See application file for complete search history.

(56) References Cited

U.S. PATENT DOCUMENTS

| | | | | |
|---|---|---|---|---|
| 3,496,409 | A | 2/1970 | Connell | 315/36 |
| 3,889,158 | A * | 6/1975 | Peterson | 361/16 |
| 4,384,289 | A | 5/1983 | Stillwell et al. | |
| 4,541,848 | A * | 9/1985 | Masuda | 96/54 |
| 4,723,187 | A | 2/1988 | Howell | |
| 4,827,272 | A | 5/1989 | Davis | |
| 4,847,780 | A | 7/1989 | Gilker et al. | |
| 5,374,792 | A | 12/1994 | Ghezzo et al. | |
| 5,426,360 | A | 6/1995 | Maraio et al. | |
| 5,430,597 | A | 7/1995 | Bagepalli et al. | 361/93 |
| 5,454,904 | A | 10/1995 | Ghezzo et al. | |
| 5,502,374 | A | 3/1996 | Cota | |
| 5,889,643 | A | 3/1999 | Elms | |
| 5,940,260 | A | 8/1999 | Gelbien et al. | |
| 5,943,223 | A | 8/1999 | Pond | 363/21 |
| 5,973,896 | A | 10/1999 | Hirsh et al. | |
| 6,054,659 | A | 4/2000 | Lee et al. | |
| 6,275,366 | B1 | 8/2001 | Gelbien et al. | |

(Continued)

FOREIGN PATENT DOCUMENTS

| | | | |
|---|---|---|---|
| DE | 19850397 | A1 | 5/2000 |
| DE | 19927762 | A1 | 1/2001 |

(Continued)

OTHER PUBLICATIONS

European Search Report for European Application No. 07110554.8; European Filing Date of Oct. 19, 2007; Date of Mailing Oct. 30, 2007; (6 pgs).

(Continued)

*Primary Examiner* — Rexford Barnie
*Assistant Examiner* — Ann Hoang
(74) *Attorney, Agent, or Firm* — Cantor Colburn LLP

(57) ABSTRACT

A current control device is disclosed. The current control device includes control circuitry integrally arranged with a current path and at least one micro electromechanical system (MEMS) switch disposed in the current path. The current control device further includes a hybrid arcless limiting technology (HALT) circuit connected in parallel with the at least one MEMS switch facilitating arcless opening of the at least one MEMS switch, and a pulse assisted turn on (PATO) circuit connected in parallel with the at least one MEMS switch facilitating arcless closing of the at least one MEMS switch.

17 Claims, 8 Drawing Sheets

U.S. PATENT DOCUMENTS

| | | | | |
|---|---|---|---|---|
| 6,563,683 | B1 | 5/2003 | Strumpler | 361/93.1 |
| 6,738,246 | B1 | 5/2004 | Strumpler | 361/93.1 |
| 6,904,471 | B2 | 6/2005 | Boggs et al. | 710/8 |
| 6,952,335 | B2 * | 10/2005 | Huang et al. | 361/100 |
| 7,508,636 | B2 * | 3/2009 | Sellier et al. | 361/8 |
| 2001/0014949 | A1 | 8/2001 | Leblanc | |
| 2002/0008149 | A1 | 1/2002 | Riley et al. | |
| 2002/0145841 | A1 | 10/2002 | Williams et al. | |
| 2003/0050737 | A1 | 3/2003 | Osann, Jr. | |
| 2003/0183838 | A1 | 10/2003 | Huang et al. | |
| 2003/0212473 | A1 | 11/2003 | Vandevanter | |
| 2004/0032320 | A1 | 2/2004 | Zalitzky et al. | |
| 2004/0113713 | A1 | 6/2004 | Zipper et al. | |
| 2004/0263125 | A1 | 12/2004 | Kanno et al. | |
| 2005/0085928 | A1 | 4/2005 | Shani | 700/18 |
| 2005/0146814 | A1 | 7/2005 | Sellier et al. | |
| 2005/0248340 | A1 | 11/2005 | Berkcan et al. | 324/259 |
| 2005/0270014 | A1 | 12/2005 | Zribi et al. | 324/126 |
| 2006/0121785 | A1 | 6/2006 | Caggiano et al. | |
| 2006/0171088 | A1 * | 8/2006 | Carcouet et al. | 361/93.1 |
| 2006/0187688 | A1 | 8/2006 | Tsuruya | 363/56.12 |
| 2006/0202933 | A1 | 9/2006 | Pasch et al. | 345/94 |
| 2007/0013357 | A1 | 1/2007 | Huang et al. | 323/318 |
| 2007/0057746 | A1 | 3/2007 | Rubel | |
| 2007/0139831 | A1 * | 6/2007 | Wright et al. | 361/2 |
| 2007/0142938 | A1 | 6/2007 | Huang | 700/40 |
| 2007/0173960 | A1 | 7/2007 | Kumar | 700/40 |
| 2008/0165457 | A1 * | 7/2008 | Premerlani et al. | 361/31 |

FOREIGN PATENT DOCUMENTS

| | | | |
|---|---|---|---|
| EP | 0072422 | A1 | 2/1983 |
| EP | 0233756 | A1 | 8/1987 |
| EP | 0774822 | A1 | 5/1997 |
| EP | 1255268 | A1 | 11/2002 |
| EP | 1610142 | A1 | 12/2005 |
| EP | 1643324 | A2 | 4/2006 |
| EP | 1681694 | A1 | 7/2006 |
| GB | 2123627 | A | 2/1984 |
| JP | 59080950 | U1 | 5/1984 |
| JP | 61259416 | A | 11/1986 |
| JP | 63131411 | A | 6/1988 |
| JP | 2000513559 | A | 10/2000 |
| JP | 2004103559 | A | 10/2000 |
| SU | 936549 | A * | 12/1984 |
| WO | 9946606 | A2 | 9/1999 |
| WO | 0004392 | A1 | 1/2000 |
| WO | 2006078944 | A2 | 7/2006 |
| WO | 2006100192 | A1 | 9/2006 |

OTHER PUBLICATIONS

George G. Karady and G.T. Heydt, "Novel Concept for Medium Voltage Circuit Breakers Using Microswitches." IEEE Transactions on Power Delivery, vol. 21, No. 1., Jan. 2006, pp. 536-337.

"Power Circuit Breaker Using Micro-Mechanical Switches"; Authors: George G. Karady and Gerald Thomas Heydt; Int J. Critical Infrastructure, vol. 3, Nos. 1/2, 2007; pp. 88-100; XP008087882.

"MEMS Based Electronic Circuit Breaker as a Possible Component for and Electrical Ship", Authors: George G. Karady and Gerald T. Heydt; IEEE Electric Ship Technologies Symposium, 2005; pp. 214-218; XP-002468154.

"Advanced MEMS for High Power Integrated Distribution Systems"; Authors: Rahim Kasim, Bruce C. Kim and Josef Drobnik; IEEE Computer; Proceedings of the International Conference on MEMS, NANO and Smart Systems, 2005; pp. 1-6.

PCT International Search Report; International Application No. PCT/US2007/014379; International Filing Date Jun. 20, 2007; Date of Mailing Feb. 11, 2008.

PCT International Search Report; International Application No. PCT/US2007/071644; International Filing Date Jun. 20, 2007; Date of Mailing Feb. 13, 2008.

PCT International Search Report; International Application No. PCCT/US2007/071624; International Filing Date Jun. 20, 2007; Date of Mailing Feb. 18, 2008.

PCT International Search Report; International Application No. PCT/US2007/071627; International Filing Date Jun. 20, 2007; Date of Mailing Feb. 29, 2008.

PCT International Search Report; International Application No. PCT/US2007/071630; International Filing Date Jun. 20, 2007; Date of Mailing Mar. 7, 2008.

PCT Written Opinion of the International Searching Authority; International Application No. PCT/US2007/071630; International Filing Date Jun. 20, 2007; Date of Mailing Mar. 7, 2008.

PCT International Search Report; International Application No. PCT/US2007/071632; International Filing Date Jun. 20, 2007; Date of Mailing Feb. 29, 2008.

PCT Written Opinion of the International Searching Authority; International Application No. PCT/US2007/071632; International Filing Date Jun. 20, 2007; Date of Mailing Feb. 29, 2008.

PCT International Search Report; International Application No. PCT/US2007/014363; International Filing Date Jun. 20, 2007; Date of Mailing Mar. 4, 2008.

PCT International Search Report; International Application No. PCT/US2007/071656; International Filing Date Jun. 20, 2007; Date of Mailing Mar. 12, 2008.

PCT International Search Report; International Application No. PCT/US2007/071654; International Filing Date Jun. 20, 2007; Date of Mailing Mar. 13, 2008.

PCT International Search Report; International Application No. PCT/US2007/014362; International Filing Date Jun. 20, 2007; Date of Mailing Mar. 20, 2008.

PCT International Search Report; International Application No. PCT/US2007/071643; International Filing Date Jun. 20, 2007; Date of Mailing Feb. 8, 2008.

PCT Written Opinion of the International Searching Authority; International Application No. PCT/US2007/071643; International Filing Date Jun. 20, 2007; Date of Mailing Feb. 8, 2008.

George G. Karady and G.T. Heydt, "Novel Concept for Medium Voltage Circuit Breakers Using MIcroswitches." IEEE Transactions on Power Delivery, vol. 21, No. 1., Jan. 2006, pp. 536-537.

USPTO Office Action dated Oct. 17, 2008; Filing Date: Jun. 19, 2007; First Named Inventor: William James Premerlani; Confirmation No. 6421.

USPTO Office Action dated Oct. 24, 2008; Filing Date: Jun. 15, 2007; First Named Inventor: William James Permerlani; Confirmation No. 4167.

USPTO Office Action dated Oct. 28, 2008; Filing Date: Jun. 8, 2007; First Named Inventor: Cecil Rivers, Jr.; Confirmation No. 7895.

English Translation of Chinese Office Action for CN Application No. 200780053364.4, dated Feb. 29, 2012, pp. 1-9.

Japanese Office Action dated Jul. 17, 2012 Japanese Application No. 2010-512136; 6 PageS.

* cited by examiner

MICRO-ELECTROMECHANICAL SYSTEM BASED SWITCHING

BACKGROUND OF THE INVENTION

Embodiments of the invention relate generally to switching devices for switching on/off a current in current paths, and more particularly to micro-electromechanical system based switching devices.

To switch on/off current in electrical systems, a set of contacts may be used. The contacts may be positioned as open to stop current, and closed to promote current flow. Generally, the set of contacts may be used in contactors, circuit-breakers, current interrupters, motor starters, or similar devices. However, the principles of switching current on/off may be understood through explanation of a contactor.

A contactor is an electrical device designed to switch an electrical load ON and OFF on command. Traditionally, electromechanical contactors are employed in control gear, where the electromechanical contactors are capable of handling switching currents up to their interrupting capacity. Electromechanical contactors may also find application in power systems for switching currents. However, fault currents in power systems are typically greater than the interrupting capacity of the electromechanical contactors. Accordingly, to employ electromechanical contactors in power system applications, it may be desirable to protect the contactor from damage by backing it up with a series device that is sufficiently fast acting to interrupt fault currents prior to the contactor opening at all values of current above the interrupting capacity of the contactor.

Previously conceived solutions to facilitate use of contactors in power systems include vacuum contactors, vacuum interrupters and air break contactors, for example. Unfortunately, contactors such as vacuum contactors do not lend themselves to easy visual inspection as the contactor tips are encapsulated in a sealed, evacuated enclosure. Further, while the vacuum contactors are well stated for handling the switching of large motors, transformers, and capacitors, they are known to cause undesirable transient overvoltages, particularly as the load is switched off.

Furthermore, the electromechanical contactors generally use mechanical switches. However, as these mechanical switches tend to switch at a relatively slow speed, predictive techniques are employed in order to estimate occurrence of a zero crossing, often tens of milliseconds before the switching event is to occur, in order to facilitate opening/closing near the zero crossing for reduced arcing. Such zero crossing prediction is prone to error as many transients may occur in this prediction time interval.

As an alternative to slow mechanical and electromechanical switches, fast solid-state switches have been employed in high speed switching applications. As will be appreciated, these solid-state switches switch between a conducting state and a non-conducting state through controlled application of a voltage or bias. For example, by reverse biasing a solid-state switch, the switch may be transitioned into a non-conducting state. However, because solid-state switches do not create a physical gap between contacts as they are switched into a non-conducing state, they experience leakage current. Furthermore, due to internal resistances, if solid-state switches operate in a conducting state, they experience a voltage drop. Both the voltage drop and leakage current contribute to the generation of excess heat under normal operating circumstances, which may affect switch performance and life. Moreover, due at least in part to the inherent leakage current associated with solid-state switches, their use in circuit breaker applications is not practical.

Furthermore, switching currents on or off during current flow may produce arcs, or flashes of electricity, which are generally undesirable. As described above, contactors may switch alternating current (AC) near or at a zero-crossing point where current flow is reduced compared to other points on an alternating current sinusoid. In contrast, direct current (DC) typically does not have a zero-crossing point. As such, arcs may occur at any instance of interruption.

Therefore, direct current interruption imposes different switching requirements compared to alternating current interruption. For example, if there is a significant amount of current or voltage, an alternating current interrupter may wait for an AC sinusoidal load or fault current to reach a naturally occurring zero before interruption. In contrast, DC interrupters do not experience a naturally occurring zero, and therefore must force a lower current or voltage in order to reduce arcing. Electronic devices such as transistors or field-effect transistors may force DC current to lower levels, but have the drawback of having high conducting voltage drop and power losses.

Accordingly, there exists a need in the art for a direct current control device and/or interrupter arrangement to overcome these drawbacks.

BRIEF DESCRIPTION OF THE INVENTION

An embodiment of the invention includes a current control device. The current control device includes control circuitry integrally arranged with a current path and at least one micro electromechanical system (MEMS) switch disposed in the current path. The current control device further includes a hybrid arcless limiting technology (HALT) circuit connected in parallel with the at least one MEMS switch facilitating arcless opening of the at least one MEMS switch, and a pulse assisted turn on (PATO) circuit connected in parallel with the at least one MEMS switch facilitating arcless closing of the at least one MEMS switch.

Another embodiment of the invention includes a method of controlling an electrical current passing through a current path. The method includes transferring electrical energy from at least one micro electromechanical system (MEMS) switch to a hybrid arcless limiting technology (HALT) circuit connected in parallel with the at least one MEMS switch to facilitate opening the current path. The method further includes transferring electrical energy from the at least one MEMS switch to a pulse assisted turn on (PATO) circuit connected in parallel with the at least one MEMS switch to facilitate closing the current path.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

An embodiment of the invention provides an electrical interruption device suitable for arcless interruption of direct current. The interruption device includes micro electromechanical system (MEMS) switches. Use of MEMS switches provide fast response time. A Hybrid Arcless Limiting Technology (HALT) circuit connected in parallel with the MEMS switches provides capability for the MEMS switches to be opened without arcing at any given time regardless of current or voltage. A Pulse-Assisted Turn On (PATO) circuit connected in parallel with the MEMS switches provides capability for the MEMS switches to be closed without arcing at any given time.

Figure 1:
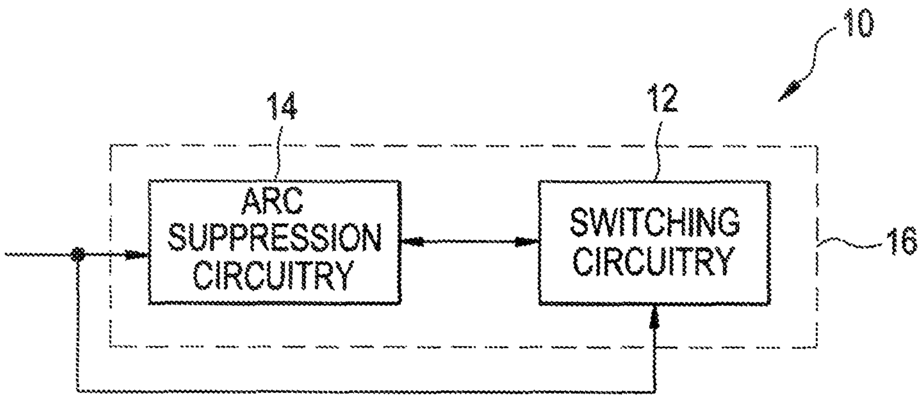
FIG. 1 is a block diagram of an exemplary MEMS based switching system in accordance with an embodiment of the invention.

FIG. 1 illustrates a block diagram of an exemplary arcless micro-electromechanical system switch (MEMS) based switching system 10, in accordance with aspects of the present invention. Presently, MEMS generally refer to micron-scale structures that for example can integrate a multiplicity of functionally distinct elements, for example, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, for example, structures that may be smaller than 100 nanometers in size. Accordingly, even though example embodiments described throughout this document may refer to MEMS-based switching devices, it is submitted that the inventive aspects of the present invention should be broadly construed and should not be limited to micron-sized devices.

As illustrated in FIG. 1, the arc-less MEMS based switching system 10 is shown as including MEMS based switching circuitry 12 and arc suppression circuitry 14, where the arc suppression circuitry 14, alternatively referred to as a Hybrid Arcless Limiting Technology (HALT) device, is operatively coupled to the MEMS based switching circuitry 12. In certain embodiments, the MEMS based switching circuitry 12 may be integrated in its entirety with the arc suppression circuitry 14 in a single package 16, for example. In other embodiments, only certain portions or components of the MEMS based switching circuitry 12 may be integrated with the arc suppression circuitry 14.

In a presently contemplated configuration as will be described in greater detail with reference to FIG. 2, the MEMS based switching circuitry 12 may include one or more MEMS switches. Additionally, the arc suppression circuitry 14 may include a balanced diode bridge and a pulse circuit. Further, the arc suppression circuitry 14 may be configured to facilitate suppression of an arc formation between contacts of the one or more MEMS switches by receiving a transfer of electrical energy from the MEMS switch in response to the MEMS switch changing state from closed to open. It may be noted that the arc suppression circuitry 14 may be configured to facilitate suppression of an arc formation in response to an alternating current (AC) or a direct current (DC).

Figure 2:
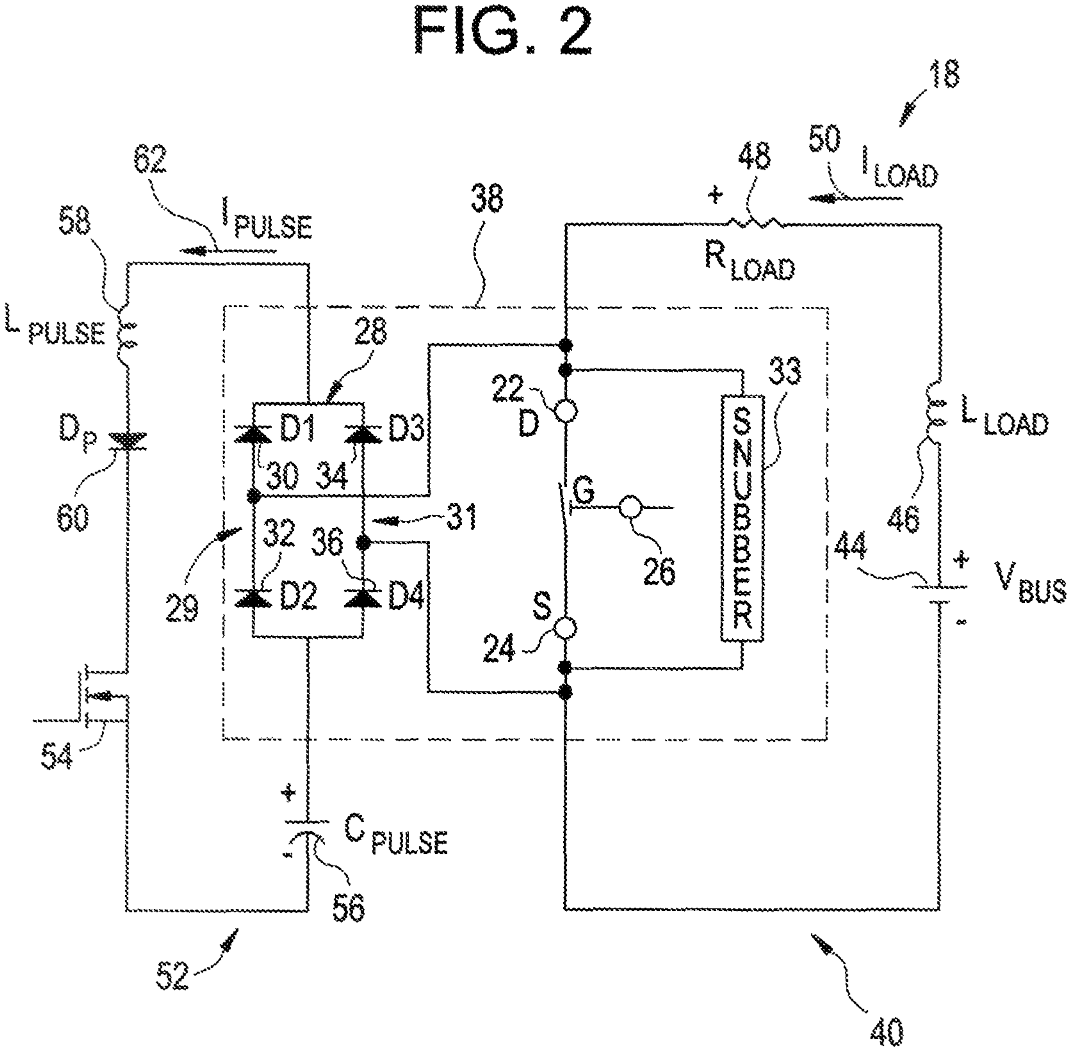
FIG. 2 is schematic diagram illustrating the exemplary MEMS based switching system depleted in FIG. 1.

Turning now to FIG. 2, a schematic diagram 18 of the exemplary arc-less MEMS based switching system depicted in FIG. 1 is illustrated in accordance with one embodiment. As noted with reference to FIG. 1, the MEMS based switching circuitry 12 may include one or more MEMS switches. In the illustrated embodiment, a first MEMS switch 20 is depicted as having a first contact 22, a second contact 24 and a third contact 26. In one embodiment, the first contact 22 may be configured as a drain, the second contact 24 may be configured as a source and the third contact 26 may he configured as a gate. Furthermore, as illustrated in FIG. 2, a voltage snubber circuit 33 may be coupled in parallel with the MEMS switch 20 and configured to limit voltage overshoot during fast contact separation as will be explained in greater detail hereinafter. In certain embodiments, the snubber circuit 33 may include a snubber capacitor (see 76, FIG. 4) coupled in series with a snubber resistor (see 78, FIG. 4). The snubber capacitor may facilitate improvement in transient voltage sharing during the sequencing of the opening of the MEMS switch 20. Furthermore, the snubber resistor may suppress any pulse of current generated by the snubber capacitor during closing operation of the MEMS switch 20. In certain other embodiments, the voltage snubber circuit 33 may include a metal oxide varistor (MOV) (not shown).

In accordance with further aspects of the present technique, a load circuit 40 may he coupled in series with the first MEMS switch 20. The load circuit 40 may include a voltage source $V_{BUS}$ 44. In addition, the load circuit 40 may also include a load inductance 46 $L_{LOAD}$, where the load inductance $L_{LOAD}$ 46 is representative of a combined load inductance and a bus inductance viewed by the load circuit 40. The load circuit 40 may also include a load resistance $R_{LOAD}$ 48 representative of a combined load resistance viewed by the load circuit 40. Reference numeral 50 is representative of a load circuit current $I_{LOAD}$ that may flow through the load circuit 40 and the first MEMS switch 20.

Further, as noted with reference to FIG. 1, the arc suppression circuitry 14 may include a balanced diode bridge. In the illustrated embodiment, a balanced diode bridge 28 is depicted as having a first branch 29 and a second branch 31. As used herein, the term "balanced diode bridge" is used to represent a diode bridge that is configured such that voltage drops across both the first and second branches 29, 31 are substantially equal. The first branch 29 of the balanced diode bridge 28 may include a first diode D1 30 and a second diode D2 32 coupled together to form a first series circuit. In a similar fashion, the second branch 31 of the balanced diode bridge 28 may include a third diode D3 34 and a fourth diode D4 36 operatively coupled together to form a second series circuit.

In one embodiment, the first MEMS switch 20 may be coupled in parallel across midpoints of the balanced diode bridge 28. The midpoints of the balanced diode bridge may include a first midpoint located between the first and second diodes 30, 32 and a second midpoint located between the third and fourth diodes 34, 36. Furthermore, the first MEMS switch 20 and the balanced diode bridge 28 may be tightly packaged to facilitate minimization of parasitic inductance caused by the balanced diode bridge 28 and in particular, the connections to the MEMS switch 20. It may be noted that, in accordance with exemplary aspects of the present technique, the first MEMS switch 20 and the balanced diode bridge 28 are positioned relative to one another such that the inherent inductance between the first MEMS switch 20 and the balanced diode bridge 28 produces a di/dt voltage less than a few percent of the voltage across the drain 22 and source 24 of the MEMS swatch 20 when carrying a transfer of the load current to the diode bridge 28 during the MEMS switch 20 turn-off which will be described in greater detail hereinafter. In one embodiment, the first MEMS switch 20 may be integrated with the balanced diode bridge 28 in a single package 38 or optionally, the same die with the intention of minimizing the inductance interconnecting the MEMS switch 20 and the diode bridge 28.

Additionally, the arc suppression circuitry 14 may include a pulse circuit 52 coupled in operative association with the balanced diode bridge 28. The pulse circuit 52 may be configured to detect a switch condition and initiate opening or the MEMS switch 20 responsive to the switch condition. As used herein, the term "switch condition" refers to a condition that triggers changing a present operating state of the MEMS switch 20. For example, the switch condition may result in changing a first closed state of the MEMS switch 20 to a second open state or a first open state of the MEMS switch 20 to a second closed state. A switch condition may occur in response to a number of actions including but not limited to a circuit fault or switch ON/OFF request.

The pulse circuit 52 may include a pulse switch 54 and a pulse capacitor $C_{PULSE}$ 56 coupled to the pulse switch 54. Further, the pulse circuit may also include a pulse inductance $L_{PULSE}$ 58 and a first diode $D_P$ 60 coupled in series with the pulse switch 54. The pulse inductance $L_{PULSE}$ 58, the diode $D_P$ 60, the pulse switch 54 and the pulse capacitor $C_{PULSE}$ 56 may be coupled in series to form a first branch of the pulse circuit 52, where the components of the first branch may be configured to facilitate pulse current shaping and timing. Also, reference numeral 62 is representative of a pulse circuit current $I_{PULSE}$ that may flow through the pulse circuit 52.

In accordance with aspects of die present invention, the MEMS switch 20 may be rapidly switched (for example, on the order of picoseconds or nanoseconds) from a first closed state to a second open state while carrying a current albeit at a near-zero voltage. This may be achieved through the combined operation of the load circuit 40, and pulse circuit 52 including the balanced diode bridge 28 coupled in parallel across contacts of the MEMS switch 20.

Figure 3:
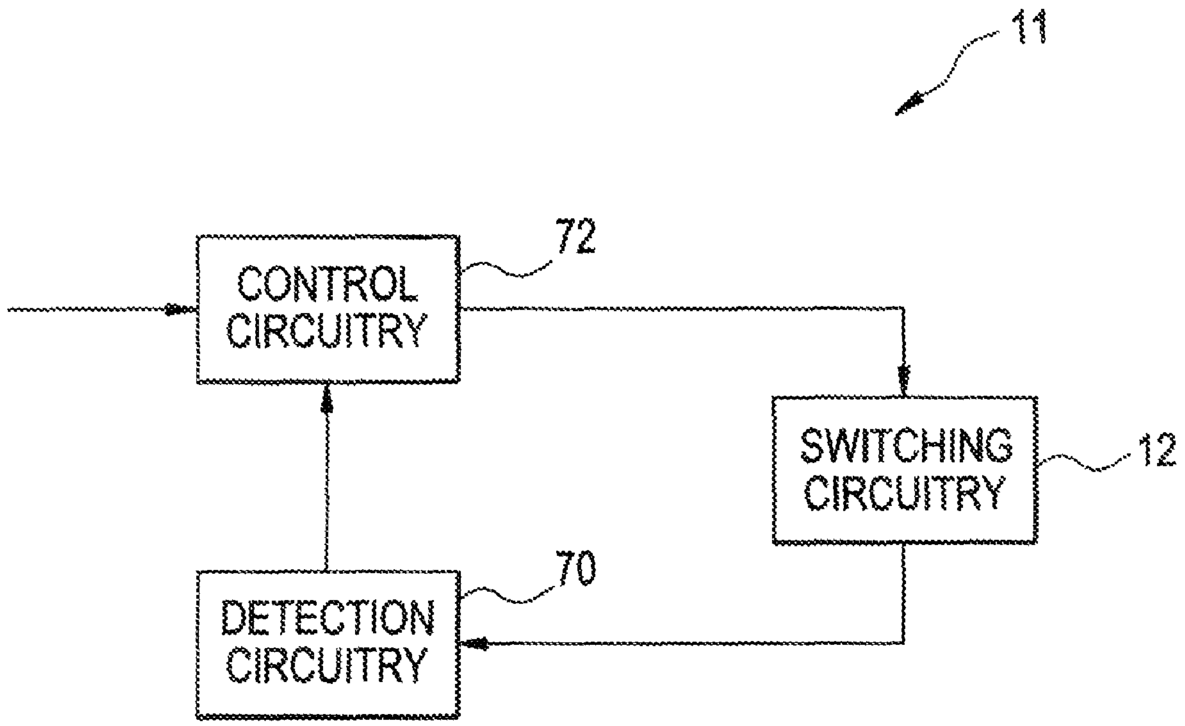
FIG. 3 is a block diagram of an exemplary MEMS based switching system in accordance with an embodiment of the invention and alternative to the system depicted in FIG. 1.

Reference is now made to FIG. 3, which illustrates a block diagram of an exemplary soft switching system 11, in accordance with aspects of the present invention. As illustrated in FIG. 3, the soft switching system 11 includes switching circuitry 12, detection circuitry 70, and control circuitry 72 operatively coupled together. The detection circuitry 70 may be coupled to the switching circuitry 12 and configured to detect an occurrence of a zero crossing of an alternating source voltage in a load circuit (hereinafter "source voltage") or an alternating current in the load circuit (hereinafter referred to as "load circuit current"). The control circuitry 72 may be coupled to the switching circuitry 12 and the detection circuitry 70, and may be configured to facilitate arc-less switching of one or more switches in the switching circuitry 12 responsive to a detected zero crossing of the alternating source voltage or the alternating load circuit current. In one embodiment, the control circuitry 72 may be configured to facilitate arc-less switching of one or more MEMS switches comprising at least part of the switching circuitry 12.

In accordance with one aspect of the invention, the soft switching system 11 may be configured to perform soft or point-on-wave (PoW) switching whereby one or more MEMS switches in the switching circuitry 12 may be closed at a time when the voltage across the switching circuitry 12 is at or very close to zero, and opened at a time when the current through the switching circuitry 12 is at or close to zero. By closing the switches at a time when the voltage across the switching circuitry 12 is at or very close to zero, pre-strike arcing can be avoided by keeping the electric field low between the contacts of the one or more MEMS switches as they close, even if multiple switches do not all close at the same time. Similarly, by opening the switches at a time when the current through the switching circuitry 12 is at or close to zero, the soft switching system 11 can be designed so that the current in the last switch to open in the switching circuitry 12 falls within the design capability of the switch. As alluded to above and in accordance with one embodiment, the control circuitry 72 may be configured to synchronize the opening and closing of the one or more MEMS switches of the switching circuitry 12 with the occurrence of a zero crossing of an alternating source voltage or an alternating load circuit current.

Figure 4:
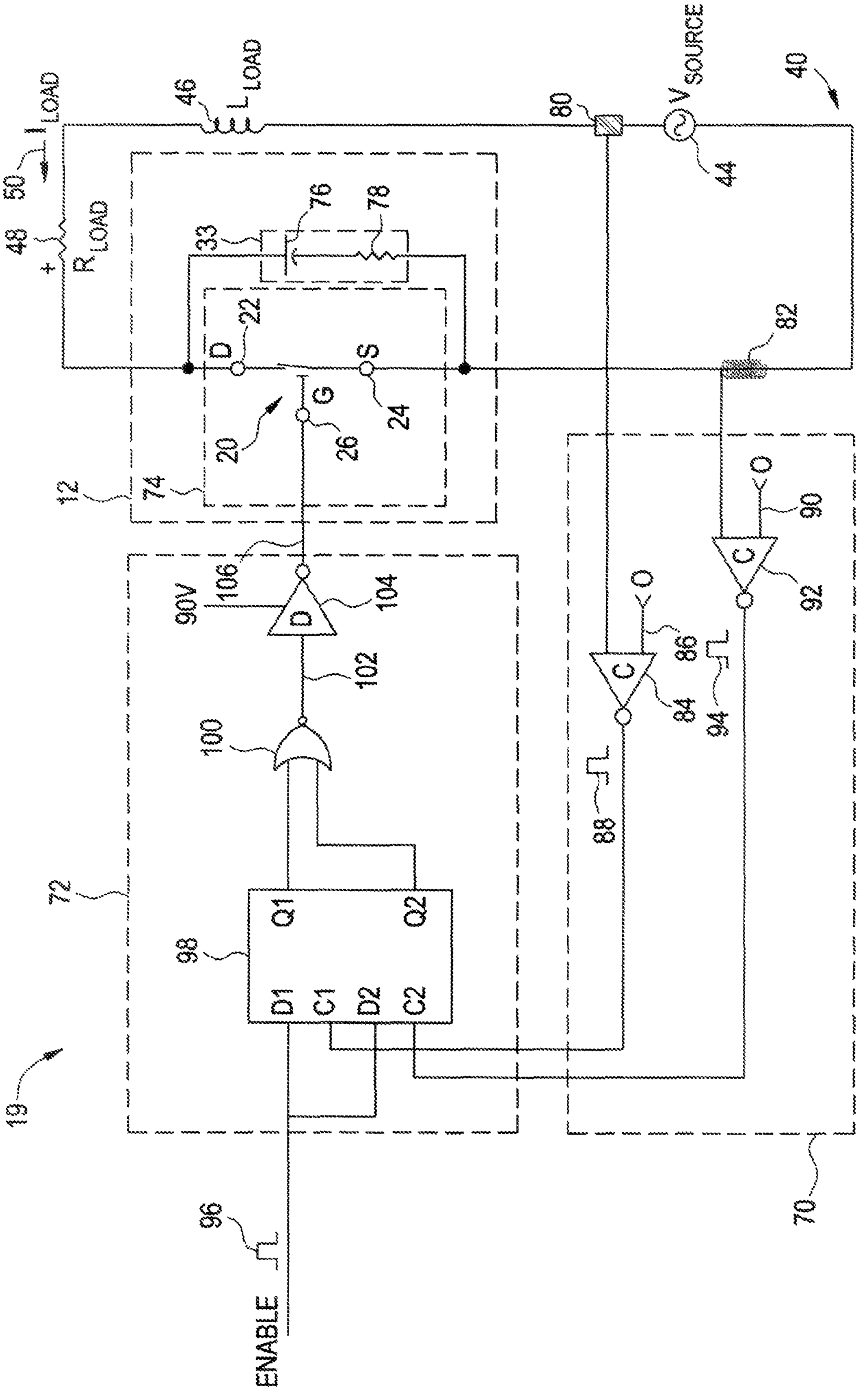
FIG. 4 is a schematic diagram illustrating the exemplary MEMS based switching system depicted in FIG. 3.

Turning to FIG. 4, a schematic diagram 19 of one embodiment of the soft switching system 11 of FIG. 3 is illustrated. In accordance with the illustrated embodiment, the schematic diagram 19 includes one example of the switching circuitry 12, the detection circuitry 70 and the control circuitry 72.

Although for the purposes of description, FIG. 4 illustrates only a single MEMS switch 20 in switching circuitry 12, the switching circuitry 12 may nonetheless include multiple MEMS switches depending upon, for example, the current and voltage handling requirements of the soft switching system 11. In one embodiment, the switching circuitry 12 may include a switch module including multiple MEMS switches coupled together in a parallel configuration to divide the current amongst the MEMS switches. In another embodiment, the switching circuitry 12 may include an array of MEMS switches coupled in a series configuration to divide the voltage amongst the MEMS switches. In yet a further embodiment, the switching circuitry 12 may include an array of MEMS switch modules coupled together in a series configuration to concurrently divide the voltage amongst the MEMS switch modules and divide the current amongst the MEMS switches in each module. In one embodiment, the one or more MEMS switches of the switching circuitry 12 may be integrated into a single package 74.

The exemplary MEMS switch 20 may include three contacts. In one embodiment, a first contact may be configured as a drain 22, a second contact may be configured as a source 24, and the third contact may be configured as a gate 26. In one embodiment, the control circuitry 72 may be coupled to the gate contact 26 to facilitate switching a current state of the MEMS switch 20. Also, in certain embodiments, damping circuitry (snubber circuit) 33 may be coupled in parallel with the MEMS switch 20 to delay appearance of voltage across the MEMS switch 20. As illustrated, the damping circuitry 33 may include a snubber capacitor 76 coupled in series with a snubber resistor 78, for example.

Additionally, the MEMS switch 20 may be coupled in series with a load circuit 40 us further illustrated in FIG. 4. In a presently contemplated configuration, the load circuit 40 may include a voltage source $V_{SOURCE}$ 44, and may possess a representative load inductance $L_{LOAD}$ 46 and a load resistance $R_{LOAD}$ 48. In one embodiment, the voltage source $V_{SOURCE}$

44 (also referred to as an AC voltage source) may be configured to generate the alternating source voltage and the alternating load current $I_{LOAD}$ 50.

As previously noted, the detection circuitry 70 may be configured to detect occurrence of a zero crossing of the alternating source voltage or the alternating load current $I_{LOAD}$ 50 in the load circuit 40. The alternating source voltage may be sensed via the voltage sensing circuitry 80 and the alternating load current $I_{LOAD}$ 50 may be sensed via the current sensing circuitry 82. The alternating source voltage and the alternating load current may be sensed continuously or at discrete periods for example.

A zero crossing of the source voltage may be detected through, for example, use of a comparator such as the illustrated zero voltage comparator 84. The voltage sensed by the voltage sensing circuitry 80 and a zero voltage reference 86 may be employed as inputs to the zero voltage comparator 84. In turn, an output signal 88 representative of a zero crossing of the source voltage of the load circuit 40 may be generated. Similarly, a zero crossing of the load current $I_{LOAD}$ 50 may also be detected through use of a comparator such as the illustrated zero current comparator 92. The current sensed by the current sensing circuitry 82 and a zero current reference 90 may be employed as inputs to the zero current comparator 92. In turn, an output signal 94 representative of a zero crossing of the load current $I_{LOAD}$ 50 may be generated.

The control circuitry 72, may in turn utilize the output signals 88 and 94 to determine when to change (for example, open or close) the current operating state of the MEMS switch 20 (or array of MEMS switches). More specifically, the control circuitry 72 may be configured to facilitate opening of the MEMS switch 20 in an arc-less manner to interrupt or open the load circuit 40 responsive to a detected zero crossing of the alternating load current $I_{LOAD}$ 50. Additionally, the control circuitry 72 may be configured to facilitate closing of the MEMS switch 20 in an arc-less manner to complete the load circuit 40 responsive to a detected zero crossing of the alternating source voltage.

In one embodiment, the control circuitry 72 may determine whether to switch the present operating state of the MEMS switch 20 to a second operating state based at least in part upon a state of an Enable signal 96. The Enable signal 96 may be generated as a result of a power off command in a contactor application, for example. In one embodiment, the Enable signal 96 and the output signals 88 and 94 may by used as input signals to a dual D flip-flop 98 as shown. These signals may he used to close the MEMS switch 20 at a first source voltage zero after the Enable signal 96 is made active (for example, rising edge triggered), and to open the MEMS switch 20 at the first load current zero after the Enable signal 96 is deactivated (for example, falling edge triggered). With respect to the illustrated schematic diagram 19 of FIG. 4, every time the Enable signal 96 is active (either high or low depending upon the specific implementation) and either output signal 88 or 94 indicates a sensed voltage or current zero, a trigger signal 102 may be generated. In one embodiment, the trigger signal 102 may be generated via a NOR gate 100, for example. The trigger signal 102 may in turn be passed through a MEMS gate driver 104 to generate a gate activation signal 106 which may be used to apply a control voltage to the gate 26 of the MEMS switch 20 (or gates in the ease of a MEMS array).

As previously noted, in order to achieve a desirable current rating for a particular application, a plurality of MEMS switches may be operatively coupled in parallel (for example, to form a switch module) in lieu of a single MEMS switch. The combined capabilities of the MEMS switches may be designed to adequately carry the continuous and transient overload current levels that may be experienced by the load circuit. For example, with a 10-amp RMS motor contactor with a 6X transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On the other hand, a single MEMS switch should be capable of interrupting the amount or level of current that will be flowing at the moment of switching.

Figure 5:
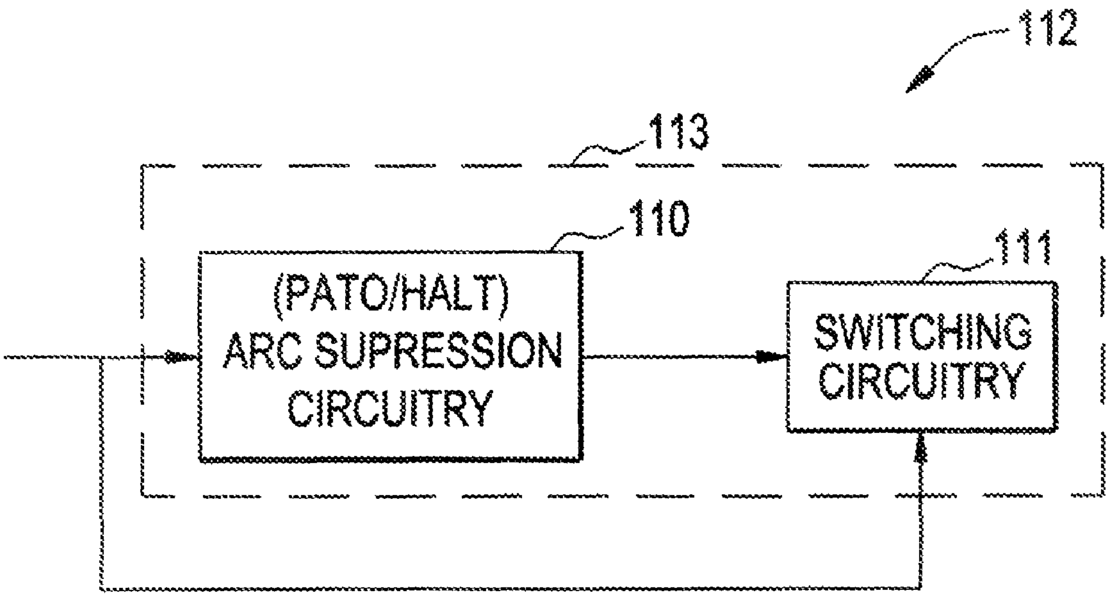
FIG. 5 is a block diagram of an exemplary MEMS based switching system in accordance with an embodiment of the invention.

However, example embodiments are not limited to arcless switching of alternating current and/or sinusoidal waveforms. As depicted in FIG. 5, example embodiments are also applicable to arcless switching of direct current and/or currents without naturally occurring zeros.

FIG. 5 illustrates a block diagram of an exemplary MEMS based switching system 112 in accordance with an embodiment of the invention. As illustrated in FIG. 5, the arcless MEMS based switching system 112 is shown as including MEMS based switching circuitry 111 and are suppression circuitry 110, where the are suppression circuitry 110, alternatively referred to as Hybrid Arcless Limiting Technology (HALT) and Pulse Assisted Turn On (PATO) circuitry, is operatively coupled to the MEMS based switching circuitry 111. In some embodiments, the MEMS based switching circuitry 111 may be integrated in its entirety with the arc suppression circuitry 110 in a single package 113, for example. In other embodiments, only certain portions or components of the MEMS based switching circuitry 111 may be integrated with the arc suppression circuitry 110.

In a presently contemplated configuration as will be described in greater detail with reference to FIG, 6, the MEMS based switching circuitry 111 may include one or more MEMS switches. Additionally, the arc suppression circuitry 110 may include a balanced diode bridge and a pulse circuit and/or pulse circuitry. Further, the are suppression circuitry 110 may be configured to facilitate suppression of an arc formation between contacts of the one or more MEMS switches by receiving a transfer of electrical energy from the MEMS switch in response to the MEMS switch changing state from closed to open (or open to closed). It may be noted that the arc suppression circuitry 110 may be configured to facilitate suppression of an arc formation in response to an alternating current (AC) or a direct current (DC).

Figure 6:
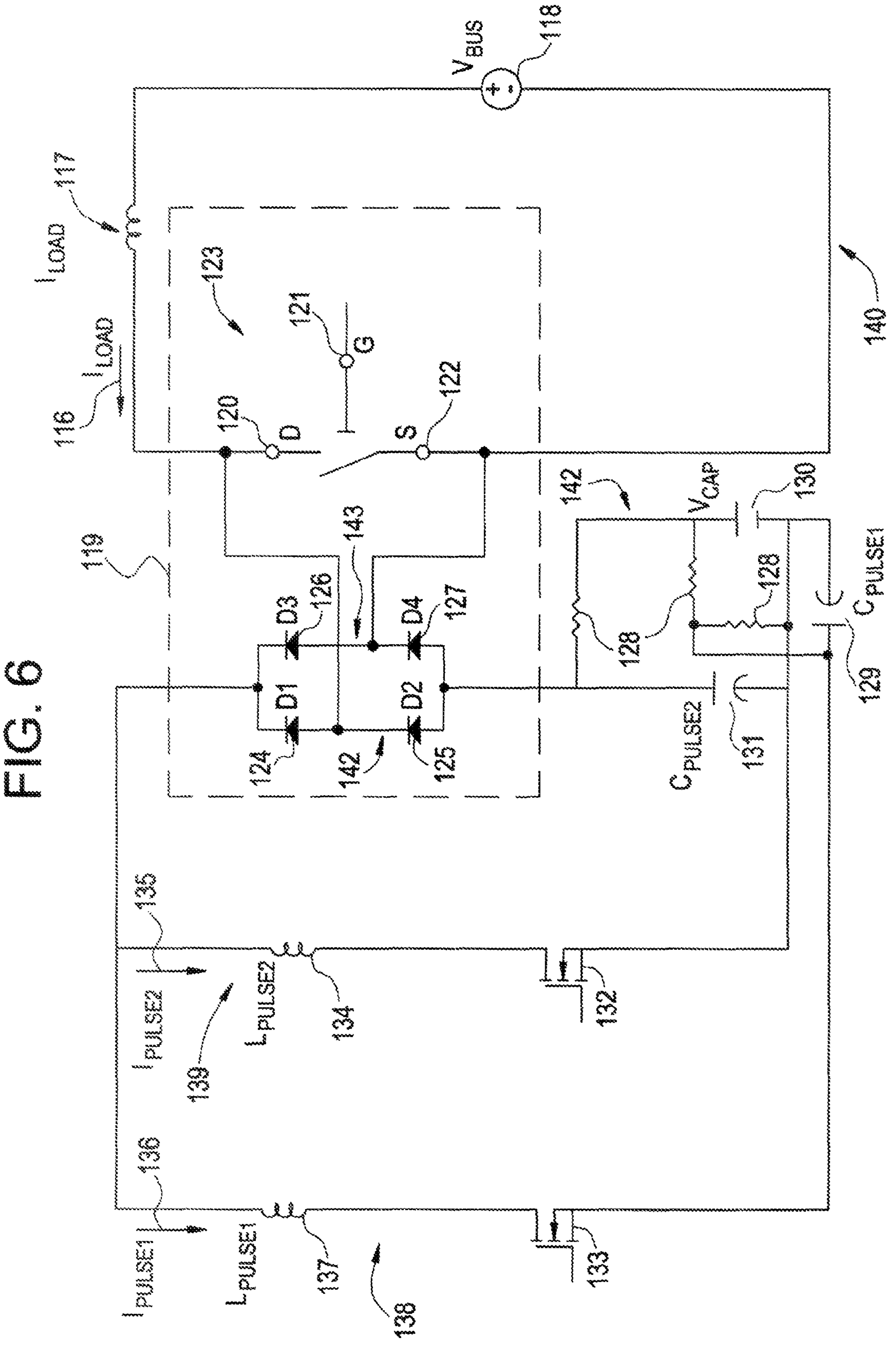
FIG. 6 is schematic diagram illustrating the exemplary MEMS based switching system depicted in FIG. 5.

Turning now to FIG. 6, a schematic diagram illustrating the exemplary MEMS based switching system depicted in FIG. 5 in accordance with one embodiment. As noted with reference to FIG. 5, the MEMS based switching circuitry 111 may include one or more MEMS switches. In the illustrated embodiment, a first MEMS switch 123 is depicted as having a first contact 120, a second contact 122 and a third contact 121. In one embodiment, the first contact 120 may be configured as a drain, the second contact 122 may be configured as a source, and the third contact 121 may be configured as a gate.

In accordance with further aspects of the present technique, a load circuit 140 may be coupled in series with the first MEMS switch 123. The load circuit 140 may include a voltage source $V_{BUS}$. In addition, the load circuit 140 may also include a load inductance 117 $L_{LOAD}$, where the load inductance $L_{LOAD}$ 117 is representative of a combined load inductance and a bus inductance viewed by the load circuit 140.

Reference numeral 116 is representative of a load circuit current $I_{LOAD}$ that may flow through the load circuit 140 and the first MEMS switch 123.

Further, as noted with reference to FIG. 5, the are suppression circuitry 112 may include a balanced diode bridge. In the illustrated embodiment, a balanced diode bridge 141 is depicted as having a first branch 142 and a second branch 143. As used herein, the term "balanced diode bridge" is used to represent a diode bridge that is configured such that voltage drops across both the first and second branches 142, 143 are substantially equal. The first branch 142 of tire balanced diode bridge 141 may include a first diode D1 124 and a second diode D2 125 coupled together to form a first series circuit. In a similar fashion, the second branch 143 of the balanced diode bridge 141 may include a third diode D3 126 and a fourth diode D4 127 operatively coupled together to form a second series circuit.

In one embodiment, the first MEMS switch 123 may be coupled in parallel across midpoints of the balanced diode bridge 141. The midpoints of the balanced diode bridge may include a first midpoint located between the first and second diodes 124, 125 and a second midpoint located between the third and fourth diodes 126, 127. Furthermore, the first MEMS switch 123 and the balanced diode bridge 141 may be tightly packaged to facilitate minimization of parasitic inductance caused by the balanced diode bridge 141 and in particular, the connections to the first MEMS switch 123. It may be noted that, in accordance with exemplary aspects of the present technique, the first MEMS switch 123 and the balanced diode bridge 141 are positioned relative to one another such that the inherent inductance between the first MEMS switch 123 and the balanced diode bridge 141 produces a di/dt voltage less than a few percent of the voltage across the drain 120 and source 122 of the first MEMS switch 123 when carrying a transfer of the load current to the diode bridge 141 during the MEMS switch 123 turn-off/on which will be described in greater detail hereinafter. In one embodiment, the first MEMS switch 123 may be integrated with the balanced diode bridge 141 in a single package 119 or optionally, the same die with the intention of reducing the inductance interconnecting the first MEMS switch 123 and the diode bridge 141.

Additionally, the arc suppression circuitry 110 may include pulse circuits 138 and 139 coupled in operative association with the balanced diode bridge 141. The pulse circuit 139 may be configured to detect a switch condition and initiate opening of the MEMS switch 123 responsive to the switch condition. Similarly, pulse circuit 138 may be configured to detect a switch condition and initiate closing of the MEMS switch 123 responsive to the switch condition. As used herein, the term "switch condition" refers to a condition that triggers changing a present operating state of the MEMS switch 123. For example, the switch condition may result in changing a first closed state of the MEMS switch 123 to a second open state or a first open state of the MEMS switch 20 to a second closed state. A switch condition may occur in response to a number of actions including but not limited to a circuit fault or switch ON/OFF request.

The pulse circuit 138 includes a pulse switch 133 and a pulse capacitor $C_{PULSE1}$ 129 series coupled to the pulse switch 133. Further, the pulse circuit 138 may include a pulse inductance $L_{PULSE1}$ 137 coupled in series with the pulse switch 133. The pulse inductance $L_{PULSE1}$ 137, the pulse switch 133, and the pulse capacitor $C_{PULSE1}$ 129 may he coupled in series to form a first branch of the pulse circuit 138, where the components of the first branch may be configured to facilitate pulse current shaping and timing. Pulse current shaping and timing may be determined from the initial voltage across the capacitor $C_{pulse1}$ (generated by a charging circuit) and from the capacitance and inductance values of $C_{pulse1}$ and $L_{pulse1}$ respectively. Therefore, pulse current shaping and timing may be facilitated through choosing different values of initial voltage, capacitance of $C_{pulse1}$ and inductance of $L_{pulse1}$. Also, reference numeral 136 is representative of a pulse circuit current $I_{PULSE1}$ that may flow through the pulse circuit 138.

The pulse circuit 138 may be operatively connected to a capacitance charging network 142 including resistors 128 and voltage source 150. The capacitance charging network may transfer electric charge to the pulse capacitor 129. In a switching event, discharge of the pulse capacitor 129 may facilitate transfer of energy from the MEMS switch 123 to the pulse circuit 138. Thus, the pulse circuit 133 may be a pulse assisted turn on (PATO) circuit to facilitate arcless closing of the first MEMS switch 123.

The pulse circuit 139 includes a pulse switch 132 and a pulse capacitor $C_{PULSE2}$ 131 series coupled to the pulse switch 132. Further, the pulse circuit 139 may include a pulse inductance $L_{PULSE2}$ 134 coupled in series with the pulse switch 132. The pulse inductance $L_{PULSE2}$ 134, the pulse switch 132 and the pulse capacitor $C_{PULSE2}$ 131 may be coupled in series to form a first branch of the pulse circuit 139, where the components of the first branch may be configured to facilitate pulse current shaping and timing. Also, reference numeral 135 is representative of a pulse circuit current $I_{PULSE2}$ that may flow through the pulse circuit 52.

The pulse circuit 139 may also be operatively connected to a capacitance charging network 142 including resistors 128 and voltage source 130. The capacitance charging network 142 may transfer electric charge to the pulse capacitor 131. In a switching event, discharge of the pulse capacitor 131 may facilitate transfer of energy from the MEMS switch 123 to the pulse circuit 139. Thus, the pulse circuit 139 may be a hybrid arcless limiting technology (HALT) circuit to facilitate arcless opening of the first MEMS switch 123.

As noted above, the pulse circuits 138 and 139 may include pulse inductances 137 and 134. However, in some example embodiments the pulse circuits 138 and 139 may share an inductance, thereby reducing the number of components in the are suppression circuitry.

In accordance with aspects of the present invention, the first MEMS switch 123 may be rapidly switched (for example, on the order of picoseconds or nanoseconds) from a first closed state to a second open state while carrying a current albeit at a near-zero voltage. This may be achieved through the combined operation of the load circuit 140, and pulse circuits 138, 139 including the balanced diode bridge 141 coupled in parallel across contacts of the first MEMS switch 123. For example, energy may be transferred from the first MEMS switch 123 to the pulse circuit 138. This may be facilitated through discharge of the pulse capacitance 129. Similarly, energy may be transferred from the first MEMS switch 123 to the pulse circuit 139. This may be facilitated through discharge of the pulse capacitance 131. It is appreciated that the resistors 128 and voltage source 130 facilitate charging of the pulse capacitors 129 and 131. Therefore, arcless operation of the MEMS switch 123 is possible through embodiments of the present invention.

However, example embodiments are not limited to current control devices including a single MEMS switch. For example, a plurality of MEMS switches may be used to achieve a different voltage rating, or different current handling capabilities, compared to a single MEMS switch. For example, a plurality of MEMS switches may be connected in parallel to achieve increased current handling capabilities. Similarly, a plurality of MEMS switches may be connected in series to achieve a higher voltage rating. Furthermore, a plurality of MEMS switches may be connected in a network including combinations of series and parallel connections to achieve a desired voltage rating and current handling capabilities. All such combinations are intended to be within the scope of example embodiments or the present invention.

Figure 7:
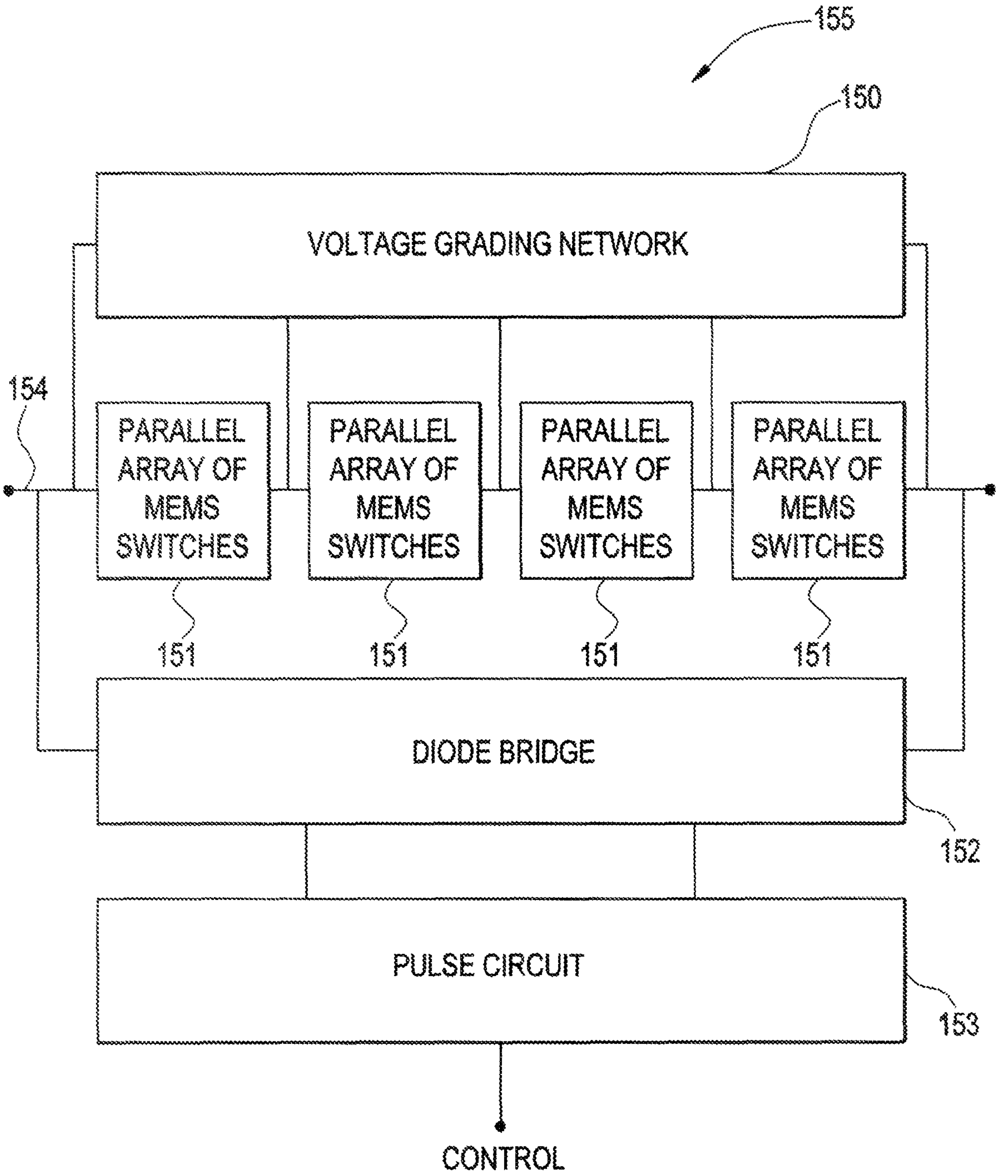
FIG. 7 is a block diagram of a MEMS switch array in accordance with an embodiment of the invention.

FIG. 7 is a block diagram of a MEMS switch array 155 in accordance with an embodiment of the invention, including a plurality of MEMS switches. As illustrated in FIG. 7, a plurality of parallel MEMS switch arrays 151 may be connected in series in a current path 154. Each parallel MEMS switch array 151 may include a plurality of MEMS switches connected in parallel with each other. As further illustrated, a balanced diode bridge 152 may be connected in parallel with the plurality of parallel MEMS switch arrays 151. For example, the balanced diode bridge 152 may be substantially similar to the balanced diode bridge 28 illustrated in FIG. 2, or the balanced diode bridge 141 illustrated in FIG. 6. Also illustrated in FIG. 7 is pulse circuit 153 operatively connected to the diode bridge 152. For example, pulse circuit 153 may include both pulse circuits 138 and 139 of FIG. 6, or pulse circuit 52 of FIG. 2. Therefore, pulse circuit 153 may facilitate arcless opening and closing of the plurality of parallel MEMS switch arrays 151.

As further illustrated in FIG. 7, voltage grading network 150 is connected across the plurality of parallel MEMS switch arrays 151, with electrical connections intermediate each array 151. The voltage grading network 150 may equalize voltage across the plurality of parallel MEMS switch arrays 151. For example, the voltage grading network 150 may include a network of passive components (e.g., resistors) to provide voltage apportionment across the plurality of parallel MEMS switch arrays 151, and/or a network of passive components (e.g., capacitors and/or varistors) to provide energy absorption to suppress overvoltages from inductive energy which may exist along the current path 154. Therefore, the MEMS switch array illustrated in FIG. 7 may be included in a current control device to control current along a current path.

Figure 8:
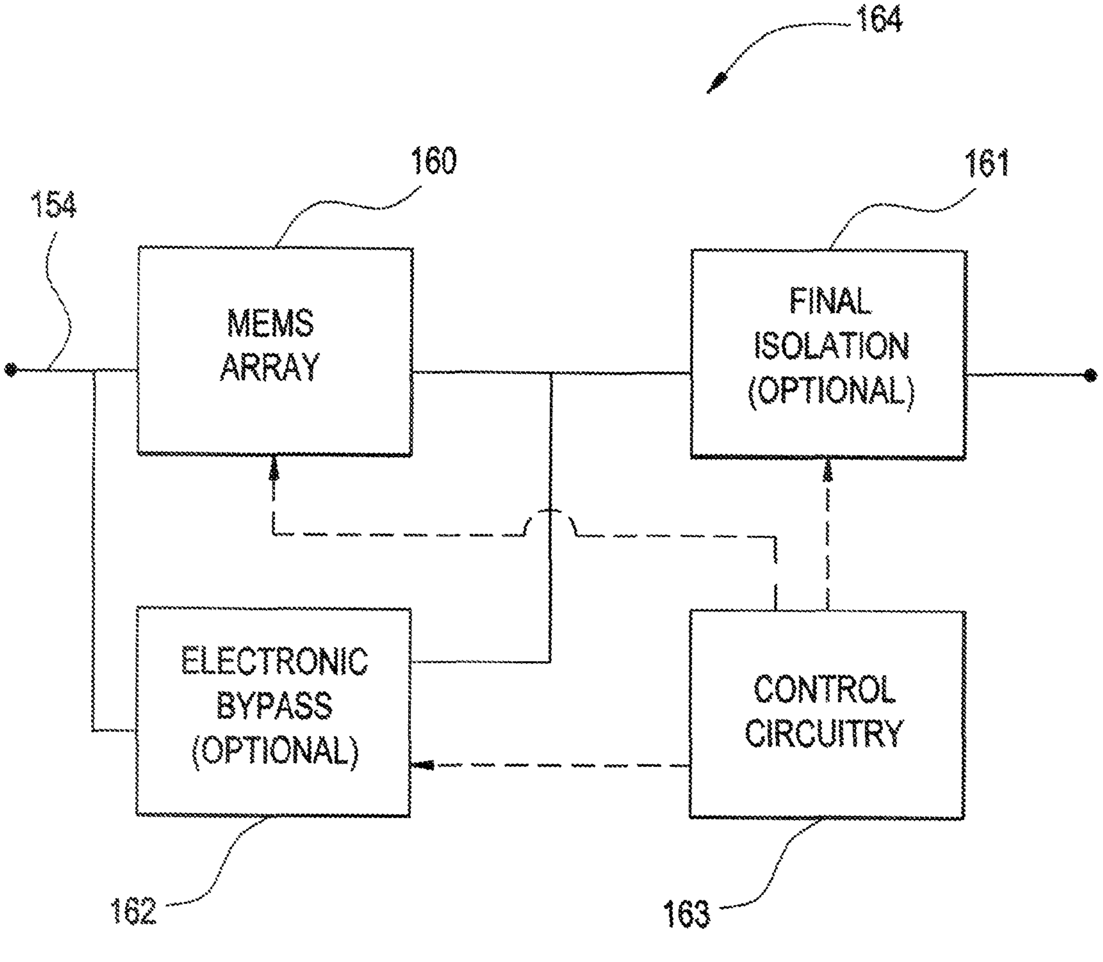
FIG. 8 is a block diagram of a current control device in accordance with an embodiment of the invention.

FIG. 8 is a block diagram of a current control device in accordance with an embodiment of the invention. As illustrated in FIG. 8, a current control device 164 may include a MEMS switch array 160 and control circuitry 163. The MEMS array 160 may include at least one MEMS switch. For example, the MEMS array 160 may be the same as, or substantially similar to, the MEMS switch array 155 of FIG. 7, the MEMS based switching system 112 of FIG. 5, or any suitable MEMS switching system including are suppression circuitry. As illustrated, the control circuitry 163 is integrally arranged with the current path 154 through at least the MEMS array 160. Further, as described above with regards to FIG. 4, the control circuitry may be integrally arranged with the current path through current sensing circuitry separate from the MEMS array circuitry.

In an example embodiment, the current control device 164 may include a final isolation device 161. The final isolation device 161 may provide air-gap safety isolation of an electrical load on the current path 154. For example, the final isolation device may include a contactor or other interruption device, which may be opened in response to the MEMS array 160 changing switch conditions.

In another example embodiment, the current control device 164 may further include an electronic bypass device 162. A bypass device may include one or more electronic components which shunt overload current away from the MEMS switches for a duration of the current overload. For example, the electronic bypass device 162 may receive overload current from the current path 153 in response to current overload. Therefore, the electronic bypass device 162 may extend the temporary overload rating of the current control device 164. It is noted that the current control device 164 may include either or both of the final isolation device 161 and electronic bypass device 162 without departing from example embodiments of the invention.

Figure 9:
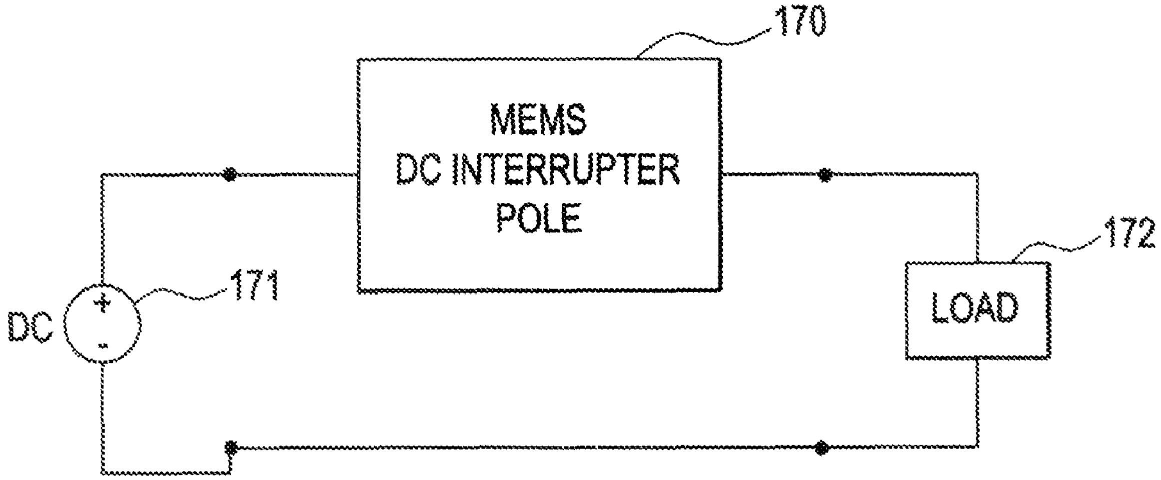
FIG. 9 is a block diagram of a single pole interrupter configuration in accordance with an embodiment of the invention.
Figure 10:
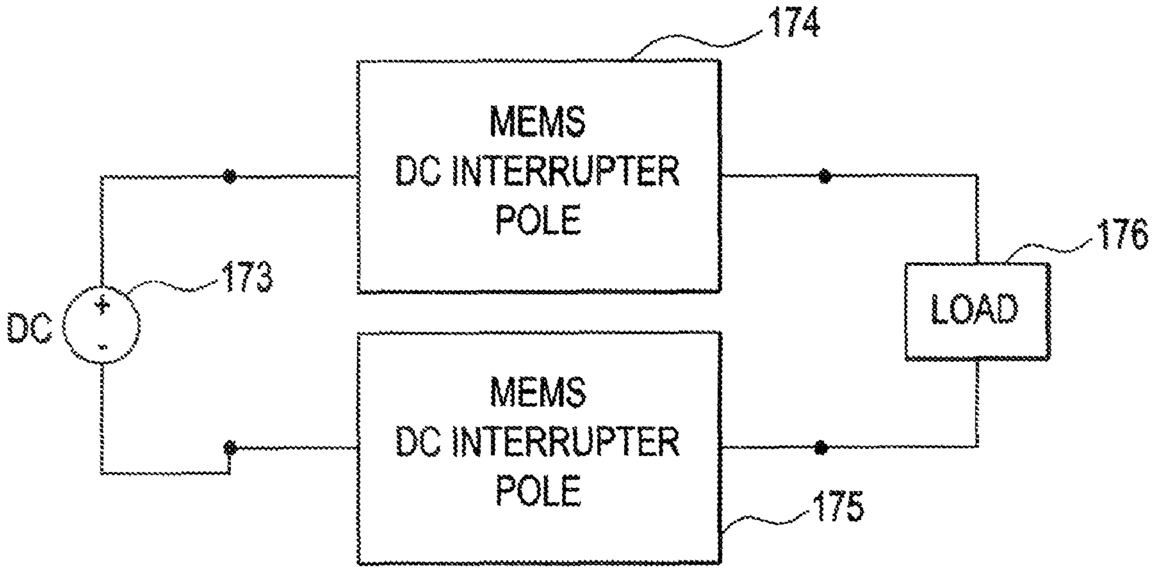
FIG. 10 is a block diagram of a double pole interrupter configuration in accordance with an embodiment of the invention.

As described hereinbefore, a current control device according to example embodiments may be used to interrupt current flow for both direct and alternating currents. Turning to FIGS. 9 and 10, example configurations of direct current control devices are illustrated.

FIG. 9 is a block diagram of a single pole interrupter configuration in accordance with an embodiment of the invention. As illustrated in FIG. 9, a MEMS interrupter pole 170 is arranged on a current path. The current path may include a voltage source 171 and a load 172. The MEMS interrupter pole 170 may interrupt current flow on the current path, thereby stopping the flow of current to the load 172. However, multiple MEMS interrupter poles may be used on current paths. Turning to FIG. 10, an example configuration including a plurality of MEMS interrupter poles is illustrated.

FIG. 10 is a pictorial diagram of a double pole interrupter configuration in accordance with an embodiment of the invention. As illustrated, MEMS interrupter poles 174 and 175 are arranged on a current path. Either of the MEMS interrupter poles may interrupt current flow on the current path. Similarly, both MEMS interrupter poles may interrupt current flow at substantially the same time. Such may be useful if additional interruption protection is deemed necessary, for example, MEMS interrupter poles 170, 174, and 175 may include current control devices as described hereinbefore.

Therefore, current control devices as described herein may include control circuitry integrally arranged with a current path, at least one micro electromechanical system (MEMS) switch disposed in the current path, a hybrid arcless limiting technology (HALT) circuit connected in parallel with the at least one MEMS switch facilitating arcless opening of the at least one MEMS switch, and a pulse assisted turn on (PATO) circuit connected in parallel with the at least one MEMS switch facilitating arcless closing of the at least one MEMS switch.

Furthermore, example embodiments provide methods of controlling an electrical current passing through a current path. For example, the method may include transferring electrical energy from at least one micro electromechanical system (MEMS) switch to a hybrid arcless limiting technology (HALT) circuit connected in parallel with the at least one MEMS switch to facilitate opening the current path. The method may further include transferring electrical energy from the at least one MEMS switch to a pulse assisted turn on (PATO) circuit connected in parallel with the at least one MEMS switch to facilitate closing the current path. Therefore, example embodiments of the present invention provide arcless current control devices, and methods of arcless current control.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A current control device comprising:

control circuitry integrally arranged with a current path;

at least one micro electromechanical system (MEMS) switch disposed in the current path;

a hybrid arcless limiting technology (HALT) circuit electrically connected with the at least one MEMS switch facilitating arcless opening of the at least one MEMS switch, wherein the HALT circuit includes a first pulse inductance, a first pulse capacitance, and a first pulse switch connected in series;

a pulse assisted turn on (PATO) circuit electrically connected with the at least one MEMS switch facilitating arcless closing of the at least one MEMS switch, wherein the PATO circuit includes a second pulse inductance, a second pulse capacitance, and a second pulse switch connected in series; and a capacitance charging network electrically connected with the HALT circuit and the PATO circuit, wherein the capacitance charging network is configured to transfer electric charge to the HALT circuit and the PATO circuit, wherein the capacitance charging network includes a voltage source, a first resistive branch operatively connected to the first pulse capacitance and the voltage source, and a second resistive branch operatively connected to the second pulse capacitance and the voltage source.

2. The current control device of claim 1, wherein discharge of the pulse capacitance facilitates arcless opening of the at least one MEMS switch.

3. The current control device of claim 1, wherein the HALT circuit is configured to receive a transfer of electrical energy from the MEMS switch in response to the MEMS switch changing state from closed to open.

4. The current control device of claim 1, wherein discharge of the pulse capacitance facilitates arcless closing of the at least one MEMS switch.

5. The current control device of claim 1, wherein the PATO circuit is configured to receive a transfer of electrical energy from the MEMS switch in response to the MEMS switch changing state from open to closed.

6. The current control device of claim 1, wherein the HALT circuit and PATO circuit include a balanced diode bridge connected in parallel with the at least one MEMS switch.

7. The current control device of claim 1, further comprising an electronic bypass circuit connected in parallel with the at least one MEMS switch to receive overload current from the current path in response to current overload in the current path.

8. The current control device of claim 7, further comprising a final isolation circuit disposed in the current path to provide air-gap safety isolation of an electrical load on the current path.

9. The current control device of claim 1, further comprising a final isolation circuit disposed in the current path to provide air-gap safety isolation of an electrical load on the current path.

10. The current control device of claim 1, wherein the at least one MEMS switch is one of a plurality of MEMS switches connected in series along the current path.

11. The current control device of claim 10, further comprising a voltage grading network electrically connected to each of the plurality of MEMS switches to equalize voltage over the plurality of MEMS switches.

12. The current control device of claim 10, wherein:

a balanced diode bridge is connected in parallel across the plurality of MEMS switches.

13. The current control device of claim 1, wherein the current control device is configured as an arcless direct current circuit breaker on the current path.

14. The current control device of claim 1, wherein the current control device is configured as an arcless direct current interrupter pole on the current path.

15. A method of controlling an electrical current passing through a current path, the method comprising:

transferring electrical energy from at least one micro electromechanical system (MEMS) switch disposed in the current path to a hybrid arcless limiting technology (HALT) circuit connected in parallel with the at least one MEMS switch to facilitate opening the current path with the at least one MEMS switch, wherein the transferring electrical energy from the at least one MEMS switch includes discharging a capacitor of a capacitance charging network connected to the HALT circuit and the MEMS switch; and transferring electrical energy from the at least one MEMS switch to a pulse assisted turn on (PATO) circuit connected in parallel with the at least one MEMS switch to facilitate closing the current path with the at least one MEMS switch, wherein the capacitance charging network includes a voltage source, a first resistive branch operatively connected to a first pulse capacitance and the voltage source, and a second resistive branch operatively connected to a second pulse capacitance and the voltage source.

16. The method of claim 15, wherein the transferring electrical energy from the at least one MEMS switch to the HALT circuit comprises:

discharging a pulse capacitance of the HALT circuit.

17. The method of claim 15, wherein the transferring electrical energy from that at least one MEMS switch to the PATO circuit comprises:

discharging a pulse capacitance of the PATO circuit.

* * * * *

UNITED STATES PATENT AND TRADEMARK OFFICE
CERTIFICATE OF CORRECTION

PATENT NO. : 8,358,488 B2
APPLICATION NO. : 11/763739
DATED : January 22, 2013
INVENTOR(S) : Premerlani et al.

It is certified that error appears in the above-identified patent and that said Letters Patent is hereby corrected as shown below:

In Column 2, Line 64, delete "depleted" and insert -- depicted --, therefor.

In Column 4, Line 18, delete "may he" and insert -- may be --, therefor.

In Column 4, Line 34, delete "may he" and insert -- may be --, therefor.

In Column 5, Line 8, delete "swatch 20" and insert -- switch 20 --, therefor.

In Column 5, Line 20, delete "opening or" and insert -- opening of --, therefor.

In Column 5, Line 41, delete "die" and insert -- the --, therefor.

In Column 6, Line 63, delete "us" and insert -- as --, therefor.

In Column 7, Line 45, delete "may by used" and insert -- may be used --, therefor.

In Column 7, Line 47, delete "may he" and insert -- may be --, therefor.

In Column 7, Line 61, delete "ease" and insert -- case --, therefor.

In Column 8, Lines 25-26, delete "are suppression circuitry" and insert -- arc suppression circuitry --, therefor at each occurrence throughout the patent.

In Column 8, Line 64, delete "$V_{BUS}$." and insert -- $V_{BUS}$ 118. --, therefor.

In Column 9, Line 11, delete "of tire" and insert -- of the --, therefor.

In Column 9, Line 64, delete "may he" and insert -- may be --, therefor.

Signed and Sealed this
Ninth Day of April, 2013

Teresa Stanek Rea
*Acting Director of the United States Patent and Trademark Office*

In Column 10, Line 12, delete “source 150.” and insert -- source 130. --, therefor.

In Column 10, Line 16, delete “circuit 133 may” and insert -- circuit 138 may --, therefor.

In Column 11, Line 8, delete “or the” and insert -- of the --, therefor.

In Column 12, Line 3, delete “path 153” and insert -- path 154 --, therefor.